US011937726B2

(12) United States Patent
Hughes

(10) Patent No.: US 11,937,726 B2
(45) Date of Patent: *Mar. 26, 2024

(54) ADJUSTABLE MOUNT ASSEMBLY FOR MOUNTING A COVERING ROD RELATIVE TO AN ARCHITECTURAL STRUCTURE AND RELATED MOUNTING SYSTEM

(71) Applicant: Hunter Douglas Inc., Pearl River, NY (US)

(72) Inventor: Jeffrey P. Hughes, Sugar Hill, GA (US)

(73) Assignee: Hunter Douglas Inc., Pearl River, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,621

(22) Filed: Sep. 14, 2022

(65) Prior Publication Data

US 2023/0000276 A1 Jan. 5, 2023

Related U.S. Application Data

(63) Continuation of application No. 17/142,685, filed on Jan. 6, 2021, now Pat. No. 11,478,101.

(60) Provisional application No. 62/958,936, filed on Jan. 9, 2020.

(51) Int. Cl.
*A47H 1/14* (2006.01)
*A47H 1/142* (2006.01)
*F16M 13/02* (2006.01)

(52) U.S. Cl.
CPC .......... *A47H 1/142* (2013.01); *F16M 13/022* (2013.01)

(58) Field of Classification Search
CPC ...... A47H 1/142; A47H 1/022; F16M 13/022; A47G 25/0692; A47G 25/0635; A47G 1/1606; A47G 1/166; A47G 1/1613; A47B 61/003; A47K 3/38
See application file for complete search history.

(56) References Cited

U.S. PATENT DOCUMENTS

| 729,881 A | 6/1903 | Mathis |
| 809,221 A | 1/1906 | Renner |
| 1,278,348 A | 9/1918 | Hines |
| 1,386,715 A | 8/1921 | Lewin |
| 1,752,683 A | 4/1930 | Meagher |
| 3,738,650 A | 6/1973 | Ossenkop |
| 3,990,582 A | 11/1976 | Schindel |

(Continued)

FOREIGN PATENT DOCUMENTS

DE 9306137 U1 6/1993

*Primary Examiner* — Ko H Chan
(74) *Attorney, Agent, or Firm* — Dority & Manning, P.A.

(57) ABSTRACT

In one aspect, an adjustable mount assembly for mounting a covering rod relative to an adjacent architectural structure comprises a rod mount including a base plate having an inner side and an outer side opposite the inner side. In addition, the rod mount further includes a rod cradle extending outwardly from the outer side of the base plate, with the rod mount being rotatable about a mount axis to adjust a circumferential position of the rod cradle. The mount assembly also includes an engagement member supported relative to the rod mount such that the engagement member is configured to engage at least a portion of the rod mount as the mount is rotated relative to the engagement member about the mount axis.

20 Claims, 8 Drawing Sheets

(56) References Cited

U.S. PATENT DOCUMENTS

| | | | | |
|---|---|---|---|---|
| 4,241,885 | A * | 12/1980 | Robinson | A47K 10/38 242/598.5 |
| 4,437,639 | A | 3/1984 | Stein | |
| 4,700,918 | A | 10/1987 | Andrasko, Jr. | |
| 4,826,119 | A * | 5/1989 | Gresens | A47K 10/10 403/384 |
| 5,022,104 | A | 6/1991 | Miller | |
| 5,988,561 | A * | 11/1999 | Mele | A47K 10/40 242/599.3 |
| 6,457,688 | B1 | 10/2002 | Welfonder | |
| 6,502,338 | B1 * | 1/2003 | Marshall | G09F 19/02 40/430 |
| 6,694,543 | B2 | 2/2004 | Moore | |
| 6,845,955 | B1 | 1/2005 | Hsu | |
| 7,055,725 | B1 | 6/2006 | Kolda | |
| 7,370,686 | B2 | 5/2008 | Rasmussen | |
| 7,997,428 | B2 | 8/2011 | Goldstein | |
| 8,069,508 | B2 | 12/2011 | O'Connell | |
| 8,132,768 | B2 | 3/2012 | Fernandez | |
| 8,141,838 | B2 * | 3/2012 | Johnson | A47G 1/164 248/496 |
| 8,205,760 | B2 | 6/2012 | Chang | |
| 8,230,972 | B2 | 7/2012 | Johnson | |
| 8,708,592 | B1 | 4/2014 | Gardner | |
| 8,800,634 | B2 | 8/2014 | Gramsch | |
| 8,925,148 | B2 | 1/2015 | Prezner | |
| 9,554,674 | B2 | 1/2017 | Forrest et al. | |
| 9,850,924 | B2 | 12/2017 | Vogtherr | |
| 10,098,508 | B1 | 10/2018 | Switzer | |
| 10,575,634 | B1 | 3/2020 | Antonelli | |
| 10,822,045 | B1 | 11/2020 | Shen | |
| 2002/0092629 | A1 | 7/2002 | Griggs | |
| 2002/0162925 | A1 * | 11/2002 | Song | A47G 25/0635 248/223.41 |
| 2007/0169260 | A1 | 7/2007 | Huang | |
| 2007/0174956 | A1 | 8/2007 | Heaslip | |
| 2018/0199747 | A1 | 7/2018 | Moss et al. | |
| 2019/0045948 | A1 * | 2/2019 | Gale | A47G 1/1613 |

* cited by examiner

ADJUSTABLE MOUNT ASSEMBLY FOR MOUNTING A COVERING ROD RELATIVE TO AN ARCHITECTURAL STRUCTURE AND RELATED MOUNTING SYSTEM

CROSS-REFERENCE TO RELATED APPLICATIONS

The present application is a continuation of U.S. patent application Ser. No. 17/142,685, filed Jan. 6, 2021, which, in turn, is based upon and claims the right of priority to U.S. Provisional Patent Application No. 62/958,936, filed Jan. 9, 2020, the disclosures of both of which are hereby incorporated by reference herein in their entirety for all purposes.

FIELD

The present disclosure relates generally to coverings for architectural structures and, more particularly, to an adjustable mount assembly for mounting a covering rod, such as curtain or drapery rod, relative to an architectural structure and a related mounting system that incorporates such mount assembly.

BACKGROUND

Rod mounts are widely available for mounting curtain or drapery rods to a window or door frame. Typically, two mounts are fixedly mounted to the opposed sides of the adjacent frame, with each mount including a cupped portion or rod cradle for receiving the opposed ends of the curtain/drapery rod. To install the ends of the rod within each rod cradle, the rod must typically be positioned vertically above the rod cradles (e.g., at a location between the rod mounts and the top of the frame to allow the rod to vertically clear the cradles) and subsequently lowered down into the cradles. Unfortunately, when such an installation technique is required for inserting the rod into the rod cradles, the rod mounts must be mounted to the sides of the frame a sufficient distance below the top of the frame to allow the rod to be inserted above and clear the rod cradles. As a result, a significant gap typically exists between the rod and the top of the frame, which results in the associated curtain or drapery being supported lower within the frame. In addition to the potential for creating significant light gaps, such a lowered position of the covering within the frame is often aesthetically undesirable to a consumer.

Accordingly, an improved mount assembly for mounting a covering rod, such as curtain or drapery rod, relative to an architectural structure would be welcomed in the technology.

BRIEF DESCRIPTION

Aspects and advantages of the present disclosure will be set forth in part in the following description, or may be obvious from the description, or may be learned through practice of the present disclosure.

In various aspects, the present disclosure is directed to an adjustable mount assembly for mounting a covering rod relative to an adjacent architectural structure. In one embodiment, the mount assembly comprises a rod mount including a base plate having an inner side and an outer side opposite the inner side. In addition, the rod mount further includes a rod cradle extending outwardly from the outer side of the base plate, with the rod mount being rotatable about a mount axis to adjust a circumferential position of the rod cradle. The mount assembly also includes an engagement member supported relative to the rod mount such that the engagement member is configured to engage at least a portion of the rod mount as the mount is rotated relative to the engagement member about the mount axis.

In another aspect, the present disclosure is directed to a mounting system for supporting architectural coverings relative to adjacent architectural structures. In one embodiment, the system comprises a rod configured to support a covering relative to an adjacent architectural structure, with the rod including a first end and an opposed second end. In addition, the system includes a rod mount assembly configured to support the first end or the second end of the rod relative to the adjacent architectural structure. The rod mount assembly may generally be configured in accordance with any of the embodiments disclosed herein.

These and other features, aspects and advantages of the present disclosure will become better understood with reference to the following Detailed Description and appended claims. The accompanying drawings, which are incorporated in and constitute a part of this specification, illustrate embodiments of the present disclosure and, together with the description, serve to explain the principles of the present disclosure.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
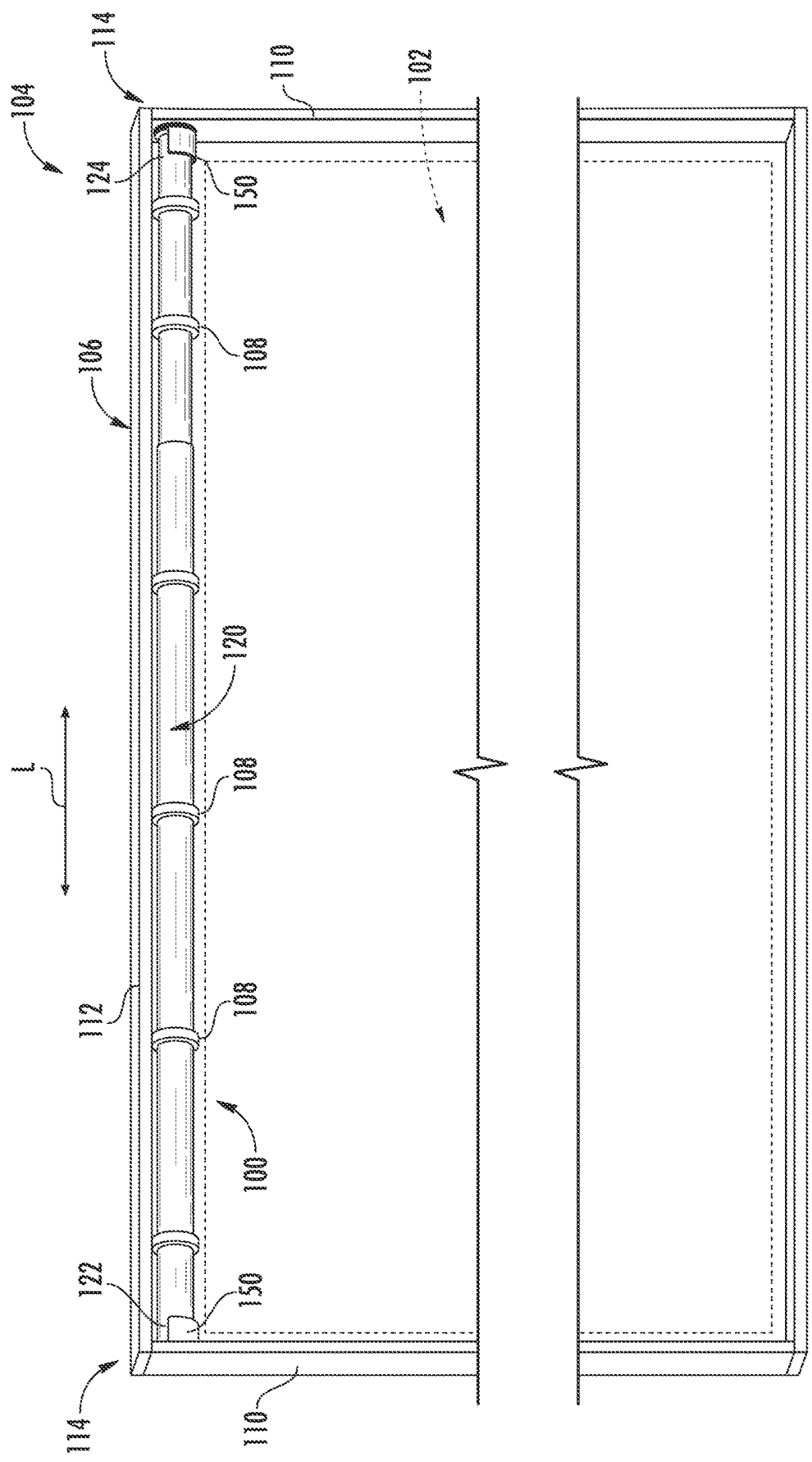
FIG. 1 illustrates a perspective view of one embodiment of a mounting system for mounting a covering relative to an adjacent architectural structure in accordance with aspects of the present disclosure, particularly illustrating the mounting system installed relative to a frame of the architectural structure.

In general, the present disclosure is directed to a rod mount assembly for supporting a covering rod relative to an architectural feature or structure (referred to herein simply as an architectural "structure" for the sake of convenience without intent to limit), such as a window or door. Specifically, in several embodiments, the rod mount assembly may include a base plate having an inner side and an outer side opposite the inner side. In addition, the rod mount may include a rod cradle extending outwardly from the outer side of the base plate, with the rod mount being rotatable about a mount axis to adjust a circumferential position of the rod cradle. The mount assembly may also include an engagement member supported relative to the rod mount such that the engagement member is configured to engage at least a portion of the rod mount as the mount is rotated relative to the engagement member about the mount axis.

In several embodiments, the engagement member may be configured to engage corresponding engagement features of the rod mount as the mount is being rotated relative to the engagement member about the mount axis. For instance, in one embodiment, the engagement member may be configured to be selectively engaged with circumferentially spaced engagement features spaced apart along a portion of the rod mount. In such an embodiment, the circumferential spacing of the engagement features may be selected, for example, so that the engagement member is engaged with a respective engagement feature of the rod mount when the circumferential position of the rod cradle is disposed at one of a plurality of pre-defined circumferential positions set for the rod cradle.

Specifically, in one embodiment, the rod mount may be configured to be rotated relative to the engagement member to re-orient or re-position the rod cradle to any number of circumferential positions to facilitate, for instance, installation (or removal) of the rod relative to the rod cradle and/or to provide a desired aesthetic or appearance for the disclosed mounting structure. For instance, as will be described in detail below, such rotatability of the rod mount may allow the rod cradle to be re-oriented to a circumferential position that allows the rod to be inserted and removed from the cradle despite the cradle being mounted a distance away from the top of the adjacent frame of the architectural structure that is less than the diameter of the rod. As such, the associated covering (e.g., a curtain or drapery) configured to be suspended from rod may be disposed at a higher position relative to the adjacent architectural structure, which may provide the covering with an improved aesthetic appearance and may also reduce or minimize any light gaps.

It should also be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. Independent concepts can be used in any configuration as may be appreciated by one ordinary skill in the art. For instance, concepts or features illustrated or described as part of one embodiment can be used separately, or with another embodiment to yield a still further embodiment. Thus, it is intended that the present disclosure covers such modifications and variations as come within the scope of the appended claims and their equivalents.

Figure 2:
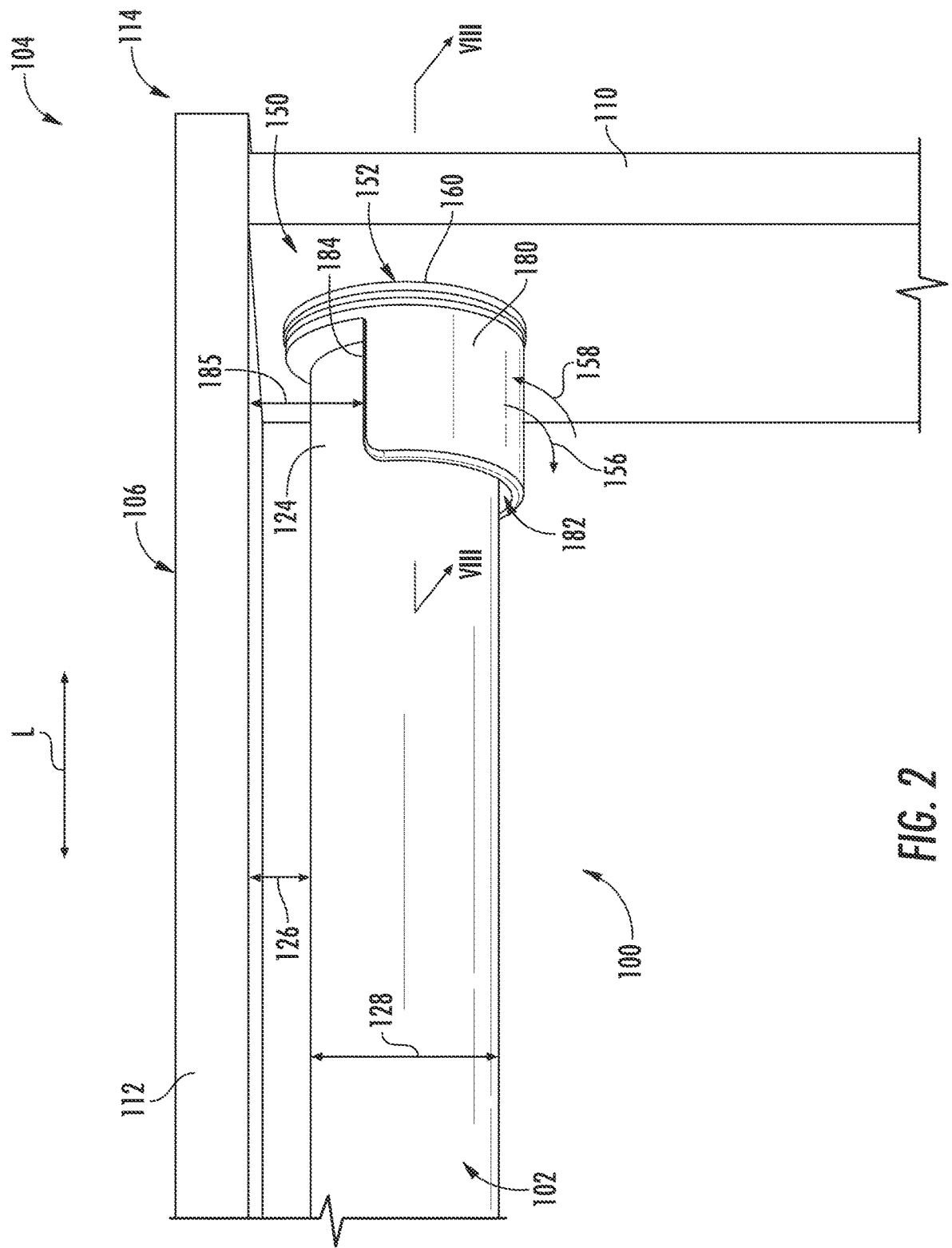
FIG. 2 illustrates a perspective view of an upper corner of the frame shown in FIG. 1 in accordance with aspects of the present disclosure, particularly illustrating a rod mount assembly installed relative to the frame for supporting a covering rod the disclosed mounting system.

Referring now to the drawings, FIGS. 1 and 2 illustrate one embodiment of a mounting system 100 for mounting a covering (indicted by dashed lines 102 in FIG. 1) relative to an adjacent architectural structure 104. In general, the mounting system 100 may be configured to be installed relative to a window, door, or any other suitable architectural structure, to allow a covering 102 to be supported or suspended relative to the architectural structure 104. For example, in the illustrated embodiment, the mounting system 100 is shown as being installed relative to a frame 106 of an architectural structure 104, such as a window frame or a door frame. However, it should be understood that the disclosed mounting system 100 is not limited in its particular use as mounting structure for a window or door covering, and may be used in any application in association with a covering 102 configured to be installed relative to and/or within any type of architectural structure 104.

As particularly shown in FIG. 1, the mounting system 100 includes a covering rod 120 and opposed rod mount assemblies 150 configured to support the rod 120 relative to the adjacent architectural structure 104. Specifically, the covering rod 120 may extend in a lateral direction (indicted by arrow L in FIGS. 1 and 2) between a first end 122 of the rod 120 and a second end 124 of the rod 120, with each rod end 122, 124 configured to be supported relative to the adjacent architectural structure 104 by a respective rod mount assembly 150. As such, when supported at its opposed ends 122, 124 by the rod mount assemblies 150, the covering rod 120 may, in turn, support a covering 102, such as a curtain, drapery, shade, and/or any other suitable covering panel or fabric, relative to the architectural structure 104. For instance, as shown in FIG. 1, suitable attachment structure 108, such as rings, clips, carriers, and/or the like, may be slidably or movably coupled to the covering rod 120 to allow an associated covering 102 to be suspended from the rod 120. Such attachment structure 108 may allow the covering 102 to be moved relative to the covering rod 120, for example, between an opened position, at which the adjacent architectural structure 104 is exposed, and a closed position, at which the adjacent architectural structure 104 is covered.

As shown in FIGS. 1 and 2, in several embodiments, the rod mount assemblies 150 may correspond to inside mount assemblies configured to be mounted within the inside of the frame 106 of the adjacent architectural structure 104. Specifically, in the illustrated embodiment, each rod mount assembly 150 is coupled to the inner side of a respective sidewall 110 of the frame 106 at a location adjacent to a top wall 112 of the frame 106 such that the rod mount assemblies 150 are configured to support the opposed ends 122, 124 of the covering rod 120 at opposed upper corners 114 of the frame 106. For instance, as particularly shown in FIG. 2, each rod mount assembly 150 is installed relative to a respective upper corner 114 of the frame 106 such that the covering rod 120 is supported a vertical distance 126 below the top wall 112 of the frame 106. As will be described in greater detail below, the disclosed rod mount assemblies 150 may allow for such vertical distance 126 to be minimized, thereby permitting the associated covering 102 to be suspended at a higher position relative to the adjacent architectural structure 104 to reduce or minimize any light gaps.

In several embodiments, each mount assembly 150 includes a rod mount 152 (FIG. 2) configured to be secured or coupled to the adjacent wall 110 of the frame 106 (e.g., via one or more fasteners) to allow the rod mount 152 to support the adjacent end 122, 124 of the covering rod 120 relative to the architectural structure 104. For instance, as particularly shown in FIG. 2, the rod mount 152 includes a base or mounting plate 160 configured to be mounted or secured to the frame 106 and a rod support or cradle 180 extending outwardly from the mounting plate 160 for supporting the adjacent end 122, 124 of the covering rod 120. For instance, the rod cradle 180 may have an arcuate or curved profile defining a semi-circular or "U-shaped" channel 182 for receiving the adjacent rod end 122, 124. As such, a portion of the adjacent end 122, 124 of the covering rod 120 may nest within the rod cradle 180 when the rod 20 is installed relative to the rod mount assembly 150.

Additionally, in accordance with aspects of the present subject matter, each rod mount 152 may be configured to be pivotably or rotatably coupled to the adjacent wall 110 of the frame 106 to allow the circumferential orientation of the rod mount 152 to be adjusted and, in particular, to allow the circumferential position of the associated rod cradle 180 to be adjusted relative to the frame 106. Specifically, in several embodiments, the rod mount 152 may be rotatable about a mount axis 154 (FIG. 3) relative to the frame 106 to rotate the rod cradle 180 through an angular range of circumferential positions. For instance, in the illustrated embodiment of FIG. 2, the rod cradle 180 is shown as being disposed at a central or "support" position at which an open end 184 of the rod channel 182 defined by the cradle 180 faces vertically upwardly such that cradle 180 wraps circumferentially around a lower portion of the rod 120. As will be described below, each rod mount 152 may be rotated from the support position relative to the frame 106 in both a first rotational direction (indicated by arrow 156 in FIG. 2) and an opposed second rotational direction (indicated by arrow 158 in FIG. 2) to any number of circumferential positions to facilitate, for instance, installation (or removal) of the ends 122, 124 of the rod 120 relative to the rod cradles 180 and/or to provide a desired aesthetic or appearance for the disclosed mounting system 100.

Figure 3:
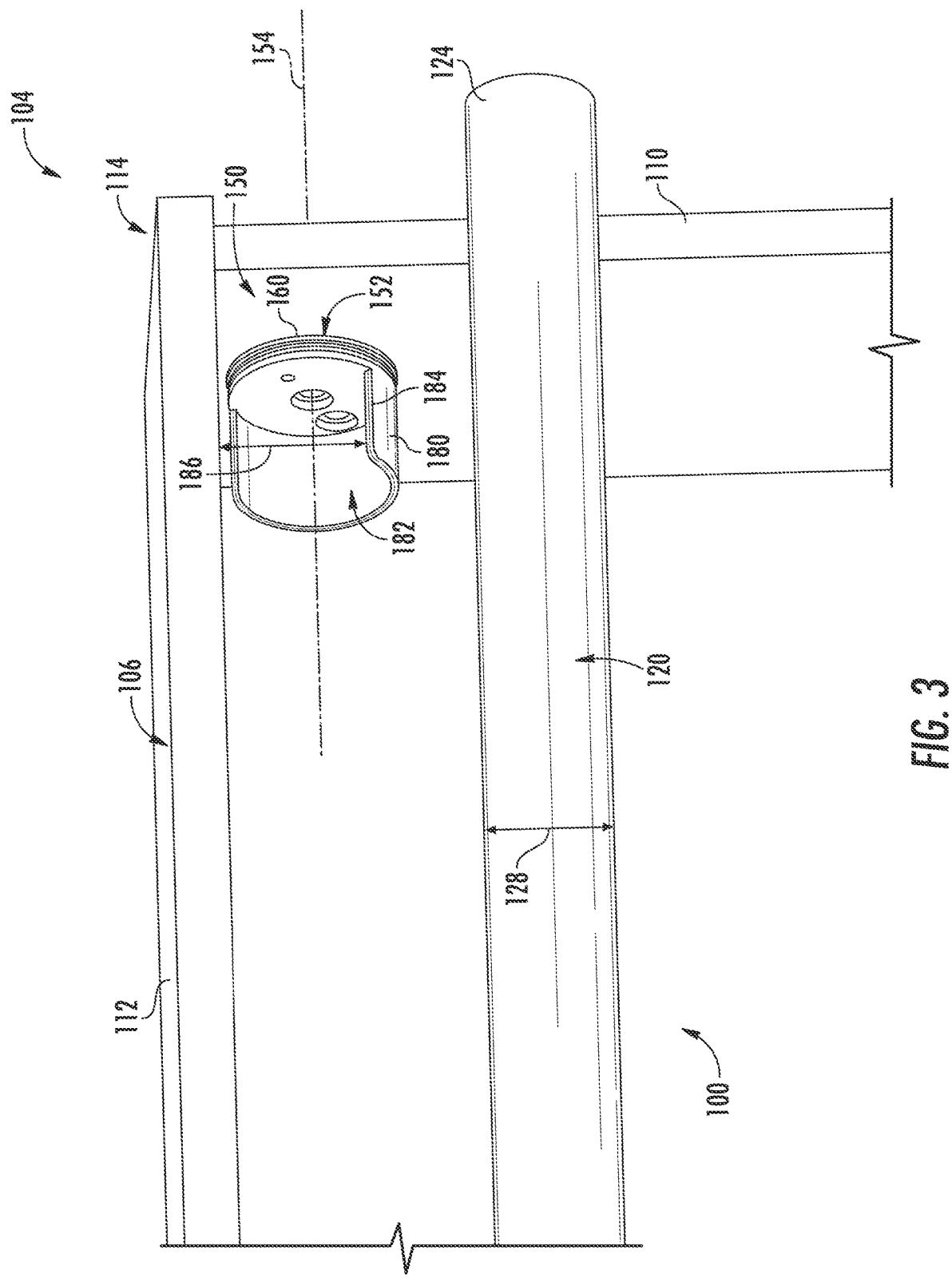
FIG. 3 illustrates a similar perspective view of the upper corner of the frame shown in FIG. 2, particularly illustrating a rod mount of the rod assembly rotated relative to the frame to facilitate installation and removal of the covering rod relative to the rod mount.

For example, as indicted above, the disclosed rod mount assemblies 150 may be configured to allow the covering rod 120 to be supported in close proximity to the top wall 112 of the frame 106 of the adjacent architectural structure 104 (e.g., by minimizing vertical distance 126). In doing so, when the rod cradle 180 is in the support position of FIG. 2, the open end 184 of the rod channel 182 may be spaced apart from the top wall 112 of the frame 106 by a distance 185 that is, for example, less than a diameter 128 of the covering rod 120. In such instance, each rod mount 152 may be rotated relative to the frame 106 (e.g., in the first rotational direction 156) to adjust the orientation of the rod cradle 180 from the upward facing orientation shown in FIG. 2 to an inward facing orientation (e.g., inwardly towards the interior of the adjacent room) to allow each rod end 122, 124 to be inserted into (and removed from) its respective rod cradle 180. For instance, FIG. 3 illustrates one of the rod mounts 152 after it has been rotated in the first rotational direction 156 relative to the adjacent frame 106 about the mount axis 154 from the support position to an "installation" position at which the rod channel 182 faces inwardly towards the interior of the room. Specifically, the rod cradle 180 has been pivoted downwardly (e.g., towards the interior of the room and away from the adjacent architectural structure) such that a vertical gap 186 is defined between the open end 184 of rod channel 182 and the top wall 112 of the frame 106 that is greater than the diameter 128 of the covering rod 120. As a result, the adjacent end 122, 124 of the covering rod 120 can be quickly and easily installed into (or removed from) the rod cradle 180. Once each end 122, 124 of the rod 120 has been installed within its respective rod cradle 180, the rod mounts 152 may then be rotated, for example, in the opposite direction (e.g., the second rotational direction 158 (FIG. 2)) back to the support position to allow the rod 120 to be retained relative to the rod mounts 152.

Figure 4:
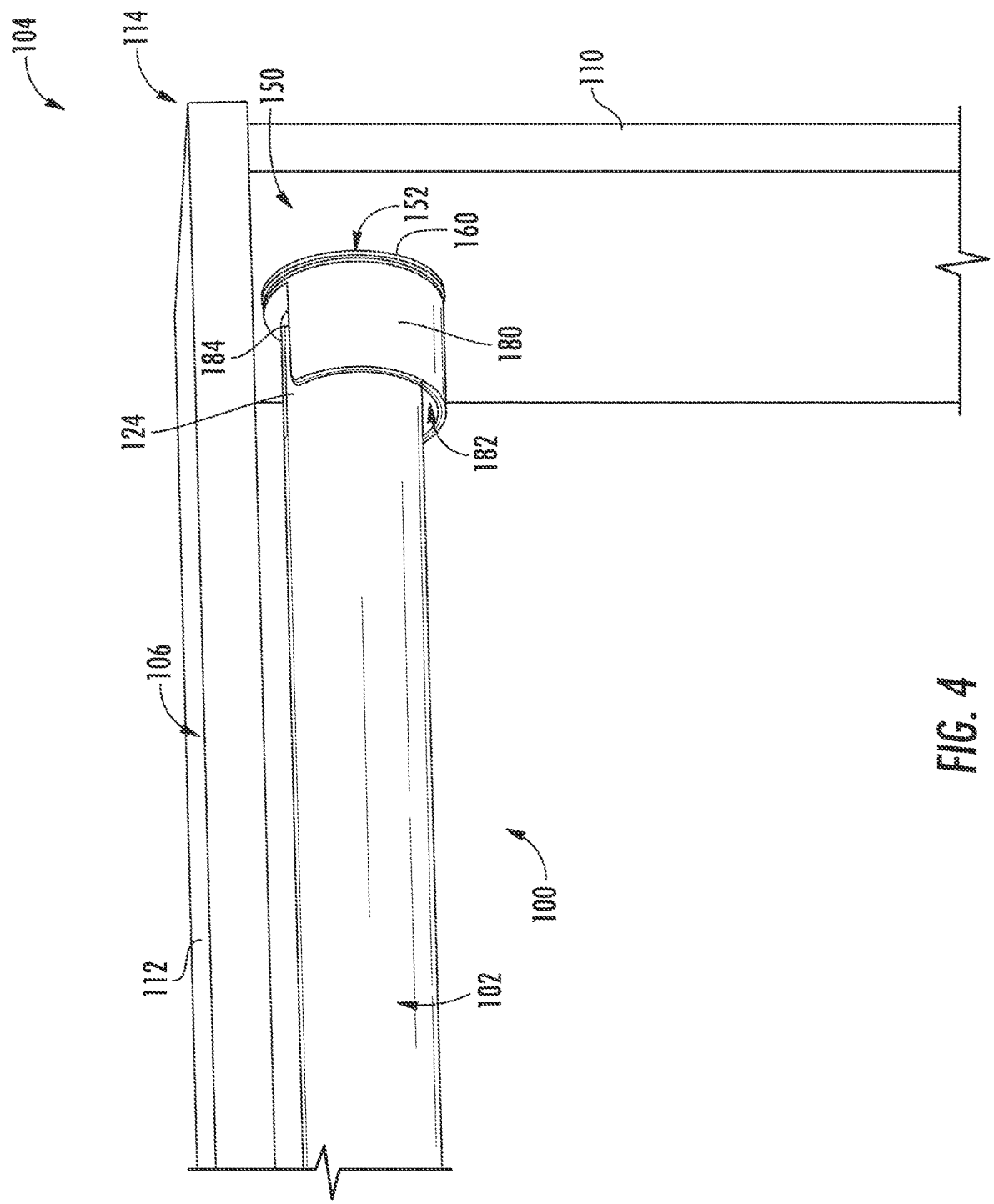
FIG. 4 illustrates another similar perspective view of the upper corner of the frame shown in FIG. 2, particularly illustrating the rod mount rotated relative to the frame to cover the end of the covering rod installed therein.

In addition to facilitating installation and removal of the rod 120 relative to the rod mount assemblies 150, the ability to rotate the rod mounts 152 relative to both the frame 106 and the rod 120 (as installed therein) may also allow the appearance or aesthetic of the rod mounting configuration to be varied, such as by allowing each rod end 122, 124 to be hidden or concealed by the adjacent rod mount 152. For instance, as shown in FIG. 2, with the rod cradle 180 in the support position, an upper portion of the rod end 122, 124 extends above the open end 184 of the rod cradle 180, and, thus, is visible from the interior of the room. However, by rotating the rod mount 152 relative to the frame 106 (e.g., in the second rotational direction 158), the orientation of the rod cradle 180 may be adjusted from the upward facing orientation shown in FIG. 2 to an outwardly facing orientation (e.g., away the interior of the room and towards the adjacent architectural structure 104) to allow the cradle 180 to conceal or hide the rod end 122, 124. For instance, FIG. 4 illustrates one of the rod mounts 152 after it has been rotated relative to the frame 106 in the second rotational direction 158 from the support position to a "cover" position at which the rod cradle 180 extends vertically across and covers or substantially covers the adjacent rod end 122, 124. At such position, the rod mount assembly 150 may provide a more solid, finished look to the mounting system 100.

Figure 5:
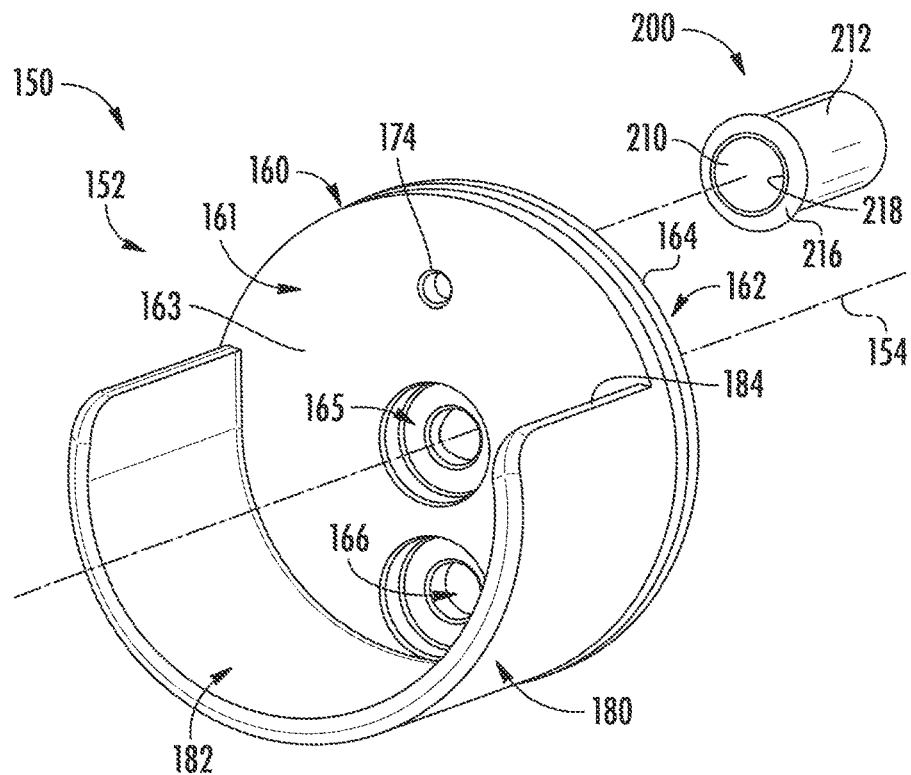
FIG. 5 illustrates a perspective, exploded view of one embodiment of a rod mount assembly in accordance with aspects of the present disclosure.
Figure 6:
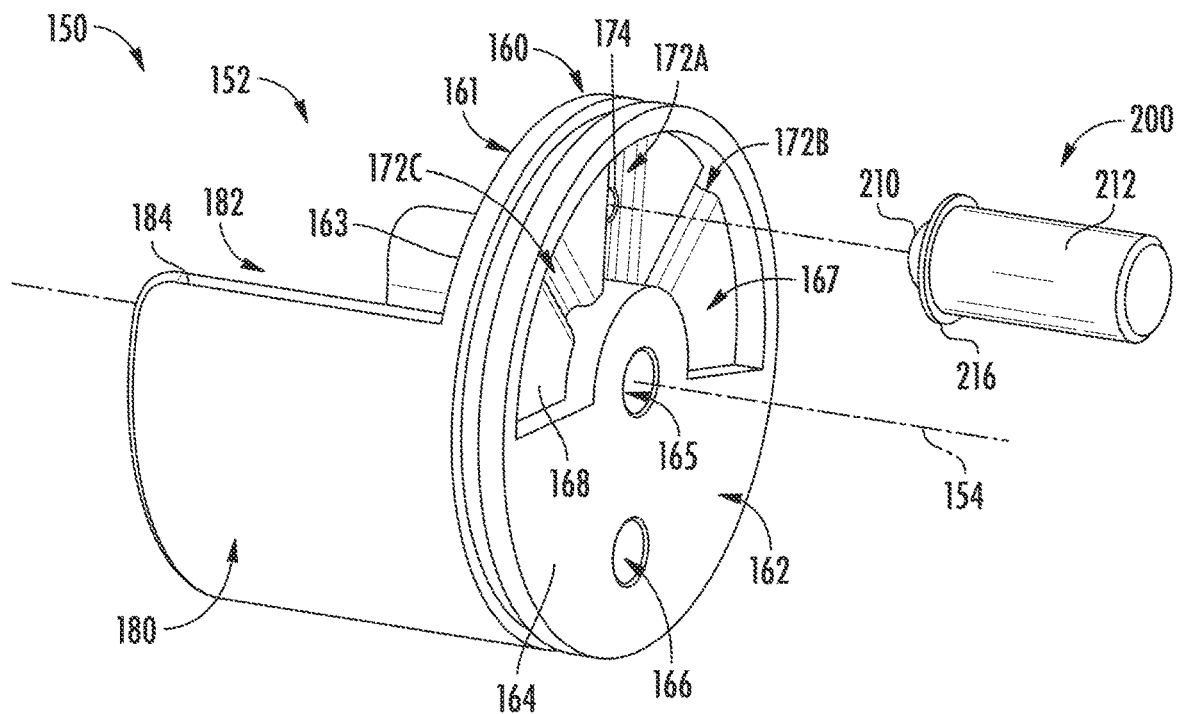
FIG. 6 illustrates an alternative perspective, exploded view of the rod mount assembly shown in FIG. 5.
Figure 7:
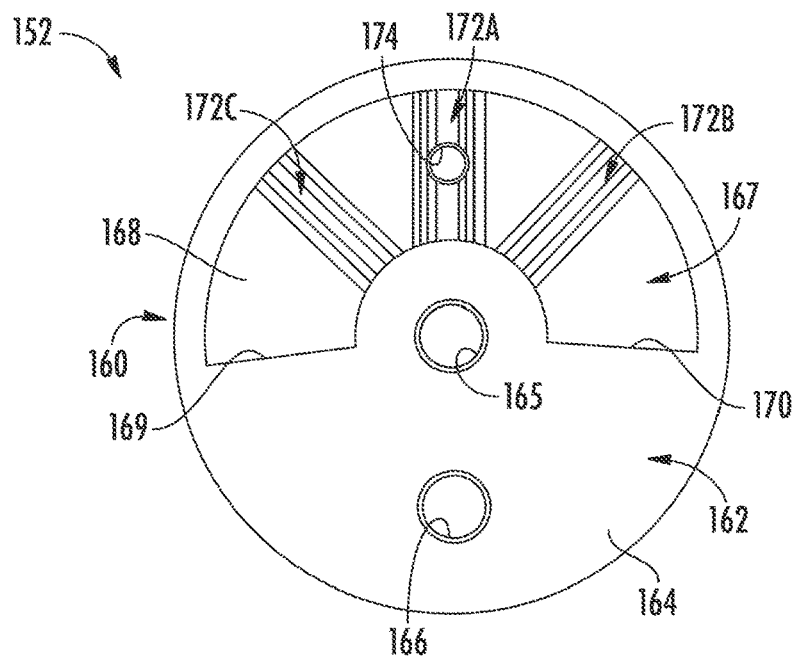
FIG. 7 illustrates an end view of a rod mount of the rod mount assembly shown in FIGS. 6 and 7, particularly illustrating engagement features of the rod mount for engaging a corresponding engagement member of the rod mount assembly in accordance with aspects of the present disclosure.
Figure 8:
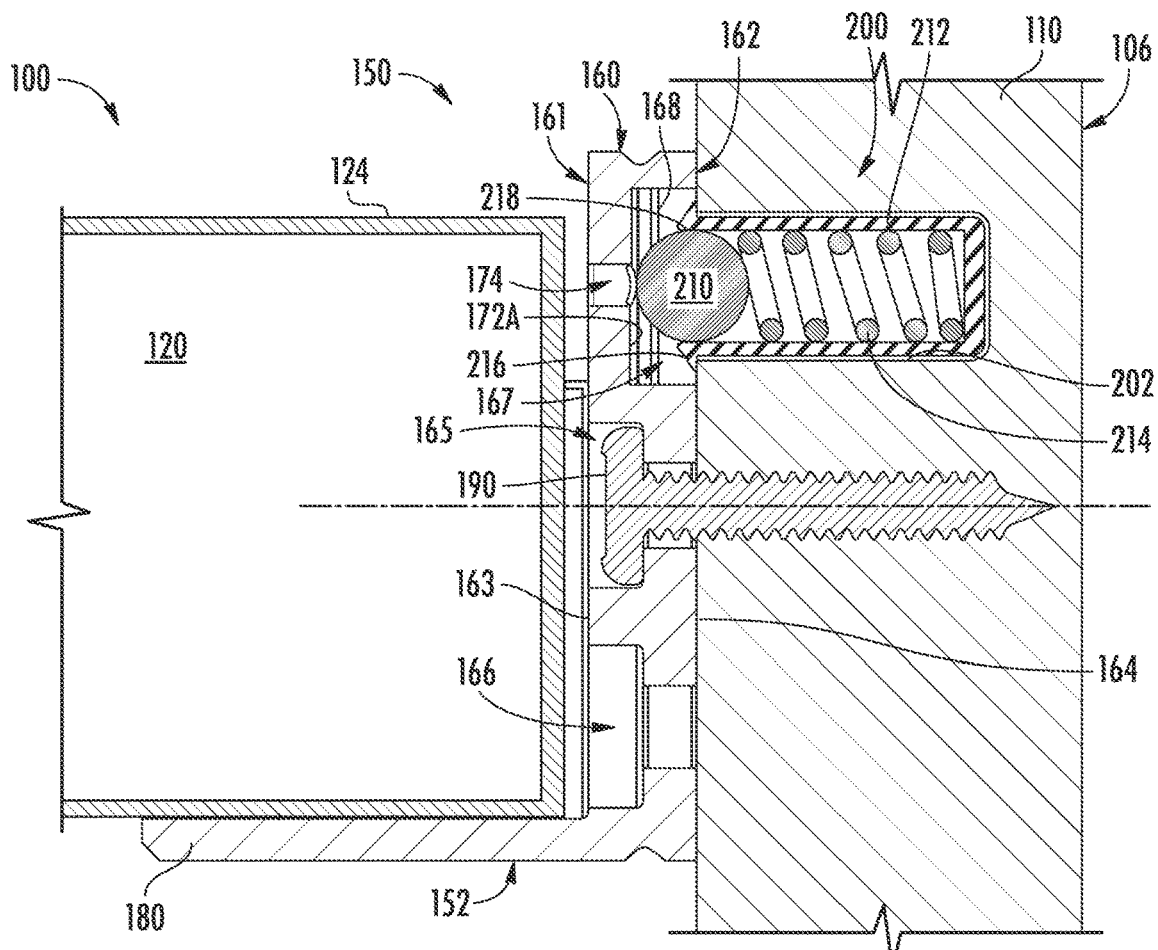
FIG. 8 illustrates a cross-sectional view of the rod mount assembly shown in FIG. 5 taken about line VII-VII shown in FIG. 2 in accordance with aspects of the present disclosure.

Referring now to FIGS. 5-8, several views of one embodiment of the rod mount assembly 150 described above are illustrated in accordance with aspects of the present subject matter. Specifically, FIGS. 5 and 6 illustrate different perspective, exploded views of the rod mount assembly 150, and FIG. 7 illustrates an end view of a rod mount 152 of the rod mount assembly 150 shown in FIGS. 5 and 6. Additionally, FIG. 8 illustrates a cross-sectional view of the rod mount assembly 150 shown in FIG. 2 taken about line VIII-VIII.

As described above, in several embodiments, the rod mount assembly 150 may include a rod mount 152 configured to be secured or coupled to the frame 106 (FIG. 8) of an adjacent architectural structure to allow the rod mount 152 to support an end 122, 124 (FIG. 8) of an associated covering rod 120 (FIG. 8) relative to the architectural structure. For instance, the rod mount 152 may include a mounting plate 160 configured to be mounted or secured to the frame 106 and a rod cradle 180 extending outwardly from the mounting plate 160 for supporting the adjacent end 122, 124 of the covering rod 120. Thus, with the mounting plate 160 secured to the frame 106 of the architectural structure, the end 122, 124 of covering rod 120 may be installed within the rod cradle 180 to allow the rod 120 to be supported relative to the architectural structure.

Additionally, in accordance with aspect of the present subject matter, the rod mount assembly 150 may also include an engagement member (e.g., a detent plunger 200) configured to engage a portion of rod mount 152 as the mount 152 is being rotated to adjust the circumferential orientation or positioning of the rod cradle 180. Specifically, as will be described below, the engagement member may be configured to engage corresponding engagement features of the rod mount 152 as the mount 152 is being rotated relative to the engagement member. For instance, in several embodiments, the engagement member may be configured to be selectively engaged with circumferentially spaced engagement features spaced apart along a portion of the rod mount 152 (e.g., the mounting plate 160). In such an embodiment, the circumferential spacing of the engagement features may be selected, for example, such that the engagement member is engaged with a respective engagement feature of the rod mount 152 when the rod cradle 180 is disposed at one of a plurality of pre-defined circumferential positions (e.g., the support, installation, and cover positions shown in FIGS. 2-4).

As shown FIGS. 5-8, the mounting plate 160 of the rod mount 152 includes an inner side 161 and an opposed outer side 162, with the inner side 161 defining an inner face 163 of the mounting plate 160 and the outer side 162 defining an outer face 164 of the mounting plate 160. As particularly shown in FIG. 8, the rod cradle 180 of the rod mount 152 extends outwardly from the inner side 161 of the mounting plate 160 such that the inner face 163 of the mounting plate 160 is generally configured to face towards the adjacent covering rod 120 when an end 122, 124 of such rod 120 is installed within the rod cradle 180. In such an embodiment, the outer side 162 of the mounting plate 160 may be configured to be disposed directly adjacent to the frame 106 of the architectural structure to which the rod mount 152 is configured to be installed. As such, the outer face 164 of the mounting plate 160 may generally be configured to face towards the adjacent wall 110 of the frame 106.

Additionally, in several embodiments, a central fastener opening 165 may be defined through mounting plate 160 for receiving a fastener 190 (FIG. 8), such as a mounting screw, for coupling the rod mount 152 to the frame 106 of the architectural structure. As particularly shown in FIGS. 5, 6 and 8, the central fastener opening 165 may extend between the opposed inner and outer sides 161, 162 of the mounting plate 160 along the rotational or mount axis 154 of the rod mount 152. As such, with the associated fastener 190 extending through the fastener opening 165, the rod mount 152 may be rotated relative to both the fastener 190 and the frame 106 of the architectural structure about the mount axis 154.

It should be appreciated that, in one embodiment, a secondary fastener opening 166 may also be defined through the mounting plate 160 for receiving a secondary fastener (not shown) for rotationally fixing the rod mount 152 relative to the adjacent frame 106 of the architectural structure. Specifically, as shown in FIGS. 5, 6 and 8, the secondary fastener opening 166 extends between the opposed inner and outer sides 161, 162 of the mounting plate 160 at a location that is radially offset from the mount axis 154 of the rod mount 152. Thus, when the rod mount 152 is secured to the adjacent frame 106 of the architectural structure via fasteners extending through both of the fastener openings 165, 166, the rod mount 152 may be prevented from rotating relative to the frame 106. Such mounting of the rod mount 152 may be used, for instance, when it is desired to have a fixed rod mount configuration as opposed to the rotatable rod mount configuration described above with reference to FIGS. 2-4.

As indicated above, the rod mount assembly 150 may also include an engagement member configured to engage a portion of rod mount 152 as the mount 152 is being rotated about the mount axis 154 to adjust the circumferential orientation or positioning of the rod cradle 180. In several embodiments, the engagement member may correspond to a detent plunger 200 configured to be installed or positioned adjacent to the outer side 162 of the mounting plate 160 of the rod mount 152. For instance, as particularly shown in FIG. 8, the detent plunger 200 is configured to be embedded or recessed within the frame 106 of the adjacent architectural structure, such as by installing the plunger 200 within a plunger opening 202 defined in the adjacent wall 110 of the frame 106. Specifically, the plunger 200 may be configured to be installed within the wall 110 of the frame 106 such that, when the rod mount 152 is secured to the wall 110 relative to the detent plunger 200 (e.g., via the fastener 190), the plunger 200 is configured to engage a portion of the outer side 162 of the mounting plate 160 as the rod mount 152 is being rotated relative to both the plunger 200 and the frame 106 about the mount axis 154 to adjust the circumferential positioning of the rod cradle 180.

In several embodiments, a portion of the plunger 200 may be configured to be biased into engagement with the outer side 162 of the mounting plate 160. For instance, as particularly shown in FIG. 8, the plunger may include a spring-biased plunger element (e.g., a detent ball 210) configured to be supported or at least partially positioned within an outer plunger housing or cartridge 212, with a biasing element or spring 214 being encased within the plunger cartridge 212 for applying an outward biasing force against the detent ball 210. Thus, with the rod mount 152 secured to the adjacent wall 110 of the frame 106 relative to the plunger 200, the detent ball 210 may be biased into engagement with the outer side 162 of the mounting plate 160 via the biasing force provided by the spring 214. As shown in FIGS. 5, 6, and 8, the plunger cartridge 212 may, in one embodiment, define a circumferential lip 216 at an open end 218 of the cartridge 212 through which the detent ball 210 extends. As particularly shown in FIG. 8, the circumferential lip 216 may, for example, be configured to abut against the adjacent wall 110 of the frame 106 when the cartridge 212 is installed within the plunger opening 202 defined in the wall 110.

As indicated above, the engagement member (e.g., the detent plunger 200) may be configured to engage corresponding engagement features of the rod mount 152 as the mount 152 is being rotated to adjust the circumferential positioning of the rod cradle 180. For instance, in several embodiments, the rod mount 152 may include a plurality of engagement features defined across a portion(s) of the outer side 162 of the mounting plate 160 to allow the plunger 200 to engage the rod mount 152 with rotation of the mount 152 relative to the engagement member 200. Specifically, as shown in FIGS. 6 and 7, a circumferential engagement slot 167 is defined across a portion of the outer side 162 of the mounting plate 160, with the engagement slot 167 defining an inner engagement surface 168 that is recessed relative to the outer face 164 of the mounting plate 160. In such an embodiment, a portion of the plunger 200 may be configured to extend within the engagement slot 167 to allow the plunger 200 to be engaged against the inner engagement surface 168 of the slot 167. For example, as shown in FIG. 8, with the rod mount 152 secured to the frame 106 relative to the plunger 200, the detent ball 210 may extend within the engagement slot 167 and engage the inner engagement surface 168. For instance, the detent ball 210 may be compressed against the inner engagement surface 168 (e.g., via the action of the spring 214) as the rod mount 152 is rotated relative to the plunger 200.

It should be appreciated that, in one embodiment, the circumferential engagement slot 167 may define the allowable angular travel range for the rod mount 152 relative to the plunger 200. For instance, as particularly shown in FIG. 7, the engagement slot 167 extends circumferentially across an angular range defined between a first end 169 of the slot 167 and an opposed second end 170 of the slot 167. In such an embodiment, the opposed ends 169, 170 of the slot 167 may be configured to serve as end stops for the rod mount 152 as it is rotated relative to the plunger 200. For example, as shown in FIG. 8, in addition to the detent ball 210, the circumferential lip 216 of the plunger cartridge 212 may also extend into the engagement slot 167 when the rod mount 152 is secured to the frame 106 relative to the plunger 200. As a result, when the rod mount 152 is rotated relative to the plunger 200, the circumferential lip 216 may be configured to abut against the adjacent end 169, 170 of the slot 167 as the rod mount 152 reaches the end of its travel range in one direction or the other.

Additionally, in several embodiments, the rod mount 152 may also include one or more engagement or detent channels 172 defined along the outer side 162 of the mounting plate 160. For instance, as shown in FIGS. 6 and 7, the rod mount 152 includes three circumferentially spaced detent channels 172A, 172B, 172C defined within the circumferential engagement slot 167 such that each detent channel 172 is recessed relative to the inner engagement surface 168 of the slot 167. In such an embodiment, a portion of the plunger 200 may be configured to be selectively received within each detect channel 172 as such channel 172 is rotated into alignment with the plunger 200 during rotation of the rod mount 152. For instance, as indicated above, the detent ball 210 of the plunger 200 may be compressed against the inner engagement surface 168 of the engagement slot 167 as the rod mount 152 is rotated relative to the plunger 200. However, as one of the detent channels 172 is moved into alignment with the plunger 200, the detent ball 210 may be pushed outwardly relative to the cartridge 212 (e.g., via the action of the spring 214) and into the aligned detent channel 172. Such engagement of the detent ball 210 within the aligned detent channel 172 may provide a retention force or a given amount of friction against the rod mount 152 that serves to retain the rod mount 152 at the associated circumferential position relative to the plunger 200. For instance, the friction applied against the rod mount 152 may be sufficient to prevent the rod mount 152 from being inadvertently or unintentionally rotated relative to the plunger 200. In such instance, an installer or user of the disclosed rod mount assembly 150 may be required to rotate the rod mount 152 with sufficient force to overcome the friction and allow the aligned detent channel 172 to be moved past the detent ball 210.

In several embodiments, the circumferential spacing of the detent channels 172 may be selected to allow the plunger 200 to be engaged or received within each channel 172 when the rod mount 152 is disposed at a predetermined or desired circumferential position relative to the plunger 200. For example, as described above with reference to FIGS. 2-4, it may be desirable to rotate the rod mount 152 to re-orient or re-position the rod cradle 180 to one of a plurality of different circumferential positions, such as the central or rod "support" position shown in FIG. 2, the rod "installation" position shown in FIG. 3, and the rod "cover" position shown in FIG. 4. Thus, in one embodiment, the circumferential spacing of the detent channels 172 may be selected so that the plunger 200 is received within one of the detent channels 172 at each of such circumferential positions. For instance, one of the detent channels 172 may correspond to a central detent channel 172A within which the detent ball 210 is configured to be received when the rod cradle 180 is disposed at its rod support position (FIG. 2). In such an embodiment, the other two detent channels (e.g., a first side detent channel 172B and a second side detent channel 172C) may be spaced apart circumferentially along either side of the central detent channel 172A such that, when the rod mount 152 is rotated in one direction or other to move the rod cradle 180 from the rod support position to either the rod installation position or the rod cover position, the plunger 200 is aligned with and received within the corresponding side detent channel 172B, 172C when the rod cradle 180 reaches the desired circumferential position. For instance, the first side detent channel 172B may be spaced apart circumferentially from the central detent channel 172A (e.g., approximately 45 degrees) such that, when the rod mount 152 is rotated in the first rotational direction 156 (FIG. 2) to move the rod cradle 180 from the support position to the rod installation position, the plunger 200 is received within the first side detent channel 172B when the rod cradle 180 reaches the rod installation position. Similarly, the second side detent channel 172C may be spaced apart circumferentially from the central detent channel 172A (e.g., approximately 45 degrees) such that, when the rod mount 152 is rotated in the second rotational direction 158 (FIG. 2) to move the rod cradle 180 from the support position to the rod cover position, the plunger 200 is received within the second side detent channel 172C when the rod cradle 180 reaches the rod cover position.

It should be appreciated that, although the rod mount 152 is shown in the illustrated embodiment as including three separate detent channels 172, the rod mount 152 may generally be configured to include any suitable number of detent channels, such as two detent channels or four or more detent channels, to allow the rod mount assembly 150 to have a corresponding number of pre-defined circumferential positions for the rod cradle 180. It should also be appreciated that, although the detent channels 172 are shown in the illustrated embodiment as being spaced apart circumferentially from one another by approximately 45 degrees, the circumferential spacing of the detent channels 172 may be varied or selected depending, for example, on the desired spacing between the pre-defined circumferential positions for the rod cradle 180.

It should also be appreciated that, in one embodiment, the rod mount 152 may further include a detent opening 174 defined through the mounting plate 160 that is configured to be coaxially aligned with the center of the detent plunger 200 when the rod mount 152 is installed on the frame 106 relative to the plunger 200. As such, the detent opening 174 may be used to ensure proper installation of the rod mount 152 and the detent plunger 200 relative to each other. For instance, with the rod mount 152 placed against the adjacent wall 110 of the frame 106 at the desired mounting location, the center of both the fastener opening 165 and the detent opening 174 may be marked on the wall 110. The plunger opening 202 may then be drilled into the wall 110 at the marked location of the center of the detent opening 174. With the plunger 200 installed within the newly formed plunger opening 202, the rod mount 152 may then be properly positioned relative to the plunger 200 by aligning both the plunger 200 with the detent opening 174 and the fastener opening 165 with the corresponding mark on the wall 110. The fastener 190 may then be inserted through the fastener opening 165 and screwed into the wall 110 to secure the rod mount 152 to the frame 106.

Figure 9:
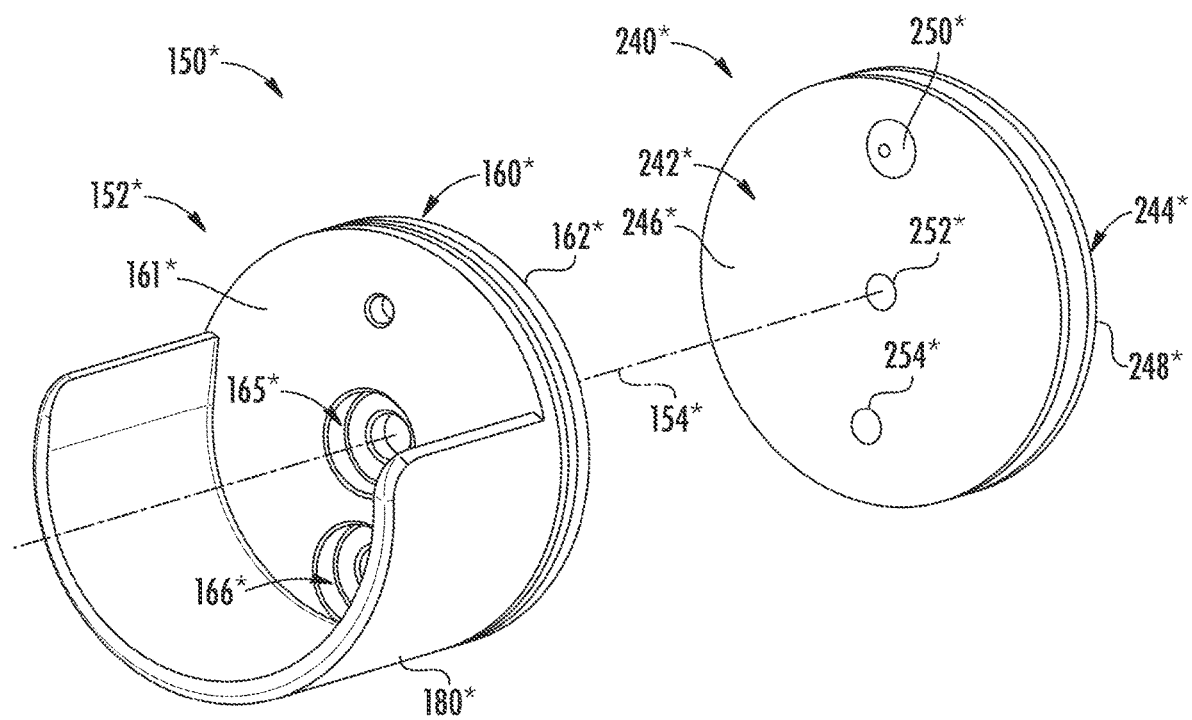
FIG. 9 illustrates a perspective, exploded view of another embodiment of a rod mount assembly in accordance with aspects of the present disclosure.
Figure 10:
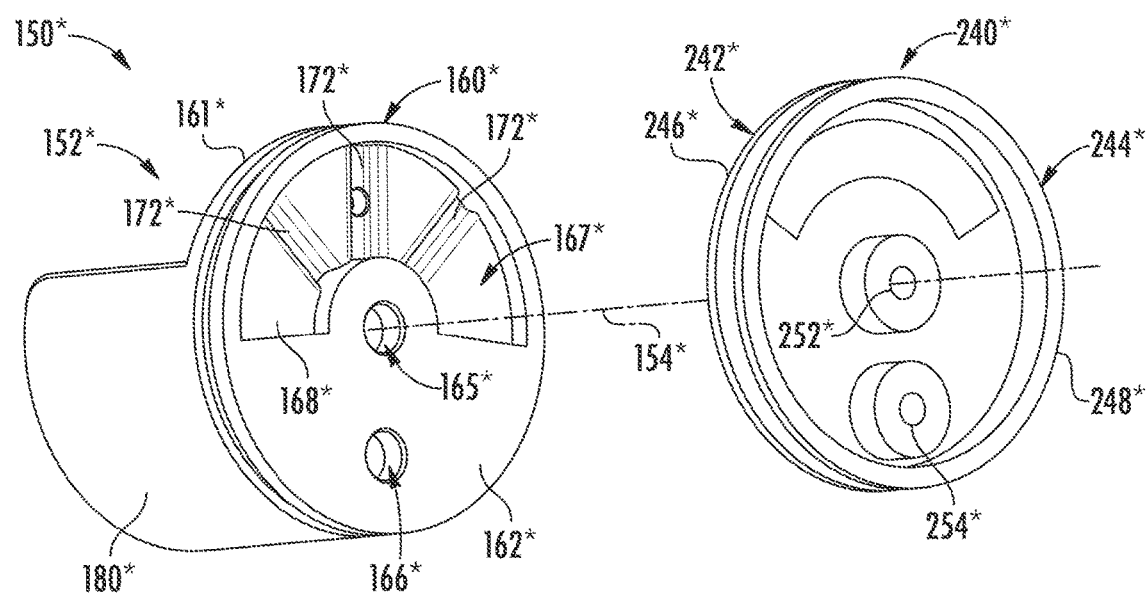
FIG. 10 illustrates an alternative perspective, exploded view of the rod mount assembly shown in FIG. 9.
Figure 11:
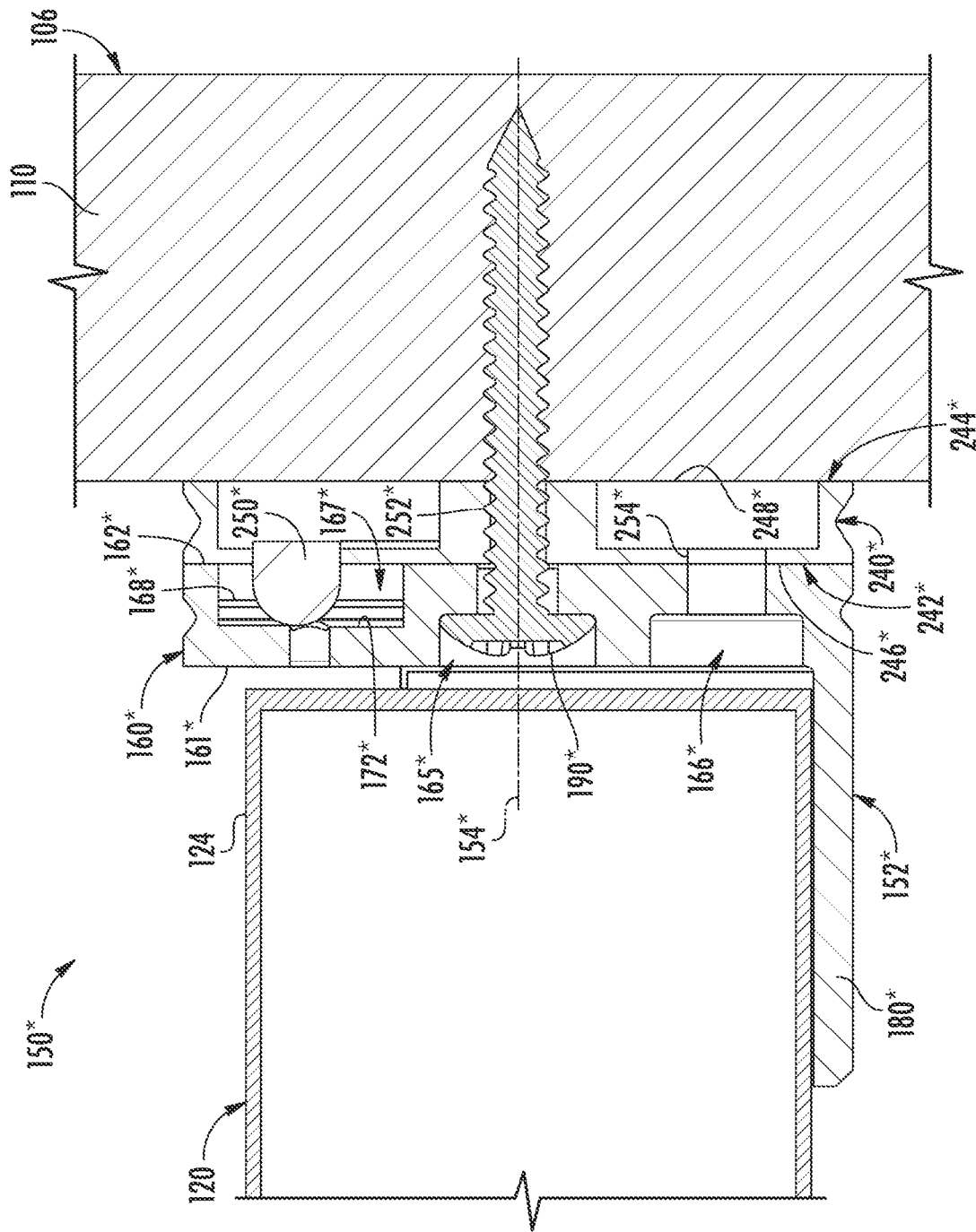
FIG. 11 illustrates a cross-sectional view of the rod mount assembly shown in FIGS. 9 and 10 as installed relative to a frame of an architectural structure in accordance with aspects of the present disclosure, particularly illustrating a similar cross-sectional view of the rod mount assembly as that shown in FIG. 8 (e.g., as taken from the perspective of line VII-VII shown in FIG. 2).

Referring now to FIGS. 9-11, several views of another embodiment of a rod mount assembly 150\* suitable for use with the disclosed mounting system are illustrated in accordance with aspects of the present subject matter. Specifically, FIGS. 9 and 10 illustrate different perspective, exploded views of the rod mount assembly 150\*, and FIG. 11 illustrates a cross-sectional view of the rod mount assembly 150\* as installed relative to the frame 106 of an adjacent architectural structure, such as a cross-section taken from the same perspective as line VIII-VIII in FIG. 2.

As shown, the rod mount assembly 150\* includes a rod mount 152\* configured to be secured or coupled to the frame 106 (FIG. 11) of an adjacent architectural structure to allow the rod mount 152\* to support an end 122, 124 (FIG. 11) of an associated covering rod 120 (FIG. 11) relative to the architectural structure. In general, the rod mount 152\* is configured the same as the rod mount 152 described above with reference to FIGS. 5-8. For instance, the rod mount 152\* includes a mounting plate 160\* defining an inner side 161\* and an outer side 162\*, and a rod cradle 180\* extending outwardly from the outer side 162\* of the mounting plate 160\* for supporting the adjacent end 122, 124 of the covering rod 120. Additionally, as shown in FIGS. 9-11, a fastener opening 165\* is defined through the mounting plate 160\* that extends along a mount axis 154\* of the rod mount 152\* for receiving a fastener 190\* (FIG. 11) configured to couple the rod mount 152\* to the adjacent wall 110 of the frame 106. An optional secondary fastener opening 166\* may also be defined through the mounting plate 160\* at a location offset from the mount axis 154\* for receiving a secondary fastener (not shown), such as when it is desired to rotationally fix the rod mount 152\* relative to the frame 106. Moreover, as particularly shown in FIG. 10, the rod mount 152\* defines a plurality of engagement features, such as a circumferential engagement slot 167\* and circumferentially spaced detent channels 172\* recessed relative to an inner engagement surface 168\* of the slot 167\*.

Additionally, similar to the rod mount assembly 150 described above with reference to FIGS. 5-8, the assembly 150\* includes an engagement member configured to engage or selectively engage one or more of the engagement features of the rod mount 152\* as the mount 152\* is being rotated to adjust the circumferential orientation or positioning of the rod cradle 180\*. However, unlike the plunger 200 described above, the engagement member is configured as an engagement plate 240\* configured to be positioned between the mounting plate 160\* of the rod mount 152\* and the adjacent wall 110 of the frame 106 when the rod mount assembly 150\* is installed relative to the associated architectural structure. Specifically, as shown in FIGS. 9 and 10, the engagement plate 240\* has a similar configuration as the mounting plate 160\* of the rod mount 152\* and includes an inner side 242\* and an opposed outer side 244\*, with the inner side 242\* defining an inner face 246\* of the engagement plate 240\* and the outer side 244\* defining an outer face 248\* of the engagement plate 240\*. As particularly shown in FIG. 11, the inner face 246\* of the engagement plate 240\* is generally configured to face towards and extend adjacent to the outer side 162\* of the mounting plate 160\* when the rod mount 152\* is installed relative to the engagement plate 240\*, while the outer face 248\* of the engagement plate 240\* is configured to face towards the adjacent wall 110 of the frame 106 on which the rod mount assembly 150\* is configured to be installed.

Moreover, to facilitate engagement between the engagement plate 240\* and the engagement features of the rod mount 152\*, the engagement plate 240\* includes a detent projection 250\* extending outwardly from the inner face 246\* of the plate 240\*. In general, the detent projection 250\* may be configured to function the same as or similar to the detent ball 210 of the plunger 200 described above. For instance, with the engagement plate 240\* installed between the rod mount 152\* and the adjacent wall 110 of the frame 106, the detent projection 250\* may be engaged with or compressed into the inner engagement surface 168\* of the engagement slot 167\* defined along the outer side 162\* of the mounting plate 160\* (e.g., due to the spring-like material properties of the engagement plate 240\*). Additionally, with rotation of the rod mount 152\* relative to the engagement plate 240\*, the detent projection 250\* may be configured to spring outwardly into or may otherwise be separately received within each of the detent channels 172\* of the rod mount 152\* as one of the detent channels 172\* is moved into alignment with the detent projection 250\*. Such engagement of the detent projection 250\* within the aligned detent channel 172\* may provide a retention force or friction against the rod mount 152\* that serves to retain the rod mount 152\* at the associated circumferential position relative to the engagement plate 240\*. Thus, similar to the rod mount assembly 150 described above, the rod mount assembly 150\* shown in FIGS. 9-11 may allow for the rod mount 152\* to be quickly and easily rotated relative to the engagement plate 240\* to re-orient or re-position the rod cradle 180\* to one of the corresponding pre-defined circumferential positions associated with receipt of the detent projection 250\* into one of the detent channels 172\*.

As shown in FIGS. 9-11, the engagement plate 240\* may also define a fastener opening 252\* configured to be aligned with the fastener opening 165\* of the mounting plate 160\* when the rod mount assembly 150\* is being installed relative to the frame 106 of the adjacent architectural structure. For instance, as particularly shown in FIG. 11, a suitable fastener 190\* (e.g., a mounting screw) may be inserted through the aligned openings 165\*, 252\* to couple the rod mount 152\* and the engagement plate 240\* to the adjacent frame wall 110. In doing so, the fastener 190\* may, for example, be configured to threadably engage the engagement plate 240\* (e.g., around the circumference of the fastener opening 252\*) while passing through the mounting plate 160* without threadably engaging such plate 160*. As a result, the rod mount 152* may be rotated relative to the fastener 190* about the mount axis 154*, as desired, to adjust the circumferential positioning of the rod cradle 180*. Additionally, as shown in FIGS. 9-11, similar to the mounting plate 160*, the engagement plate 240* may, optimally, define a secondary fastener opening 254* configured to receive a secondary fastener (not shown) when it is desired to rotationally fix the rod mount 152* relative to the engagement plate 240* and the adjacent wall 110 of the frame 106.

While the foregoing Detailed Description and drawings represent various embodiments, it will be understood that various additions, modifications, and substitutions may be made therein without departing from the spirit and scope of the present disclosure. Each example is provided by way of explanation without intent to limit the broad concepts of the present disclosure. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present disclosure covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present disclosure. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present disclosure being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present disclosure, and/or serve to distinguish regions of the associated elements from one another, and do not limit the associated element, particularly as to the position, orientation, or use of the present disclosure. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present disclosure. These examples are not the only way to implement these principles but are merely examples. Thus, references to elements or structures or features in the drawings must be appreciated as references to examples of embodiments of the present disclosure, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor.

Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. An adjustable mount assembly for mounting covering rods relative to adjacent architectural structures, the mount assembly comprising:
   a rod including a first end and an opposed second end;
   a rod mount configured to support one of said first end or said second end of said rod, said rod mount including a mounting plate having an inner side and an outer side opposite said inner side, said mounting plate defining an engagement feature that is recessed relative to said outer side of said mounting plate, said rod mount further comprising a rod cradle extending outwardly from said inner side of said mounting plate, said rod cradle defining a rod channel configured to receive said one of said first end or said second end of said rod, said rod mount being rotatable about a mount axis to adjust a circumferential position of said rod cradle, said rod channel extending from said mounting plate along said mount axis to a distal end of said rod cradle spaced apart from said mounting plate; and an engagement member supported relative to said rod mount such that said engagement member is positioned adjacent to said outer side of said mounting plate;

wherein said engagement member is configured to engage at least a portion of said engagement feature of said mounting plate.

2. The mount assembly of claim 1, wherein:

said engagement feature is one of a plurality of engagement features spaced apart circumferentially from one another along said outer side of said mounting plate; and said engagement member is configured to separately engage each of said plurality of engagement features as said rod mount is rotated relative to said engagement member about the mount axis.

3. The mount assembly of claim 2, wherein:

the circumferential position of said rod cradle is adjustable to a plurality of pre-defined circumferential positions; and said plurality of engagement features are spaced apart circumferentially from one another relative to said outer side of said mounting plate such that said rod cradle is disposed at one of said plurality of pre-defined circumferential positions when said engagement feature engages a respective one of said plurality of engagement features.

4. The mount assembly of claim 2, wherein:

said plurality of engagement features comprises a plurality of detent features; and as said rod mount is rotated relative to said engagement member about the mount axis, said engagement member is configured to be separately received within each said plurality of detent features.

5. The mount assembly of claim 1, said engagement member comprises a plunger; and a portion of said plunger is biased into engagement with said engagement feature such that said portion of said plunger engages said at least a portion of said engagement feature.

6. The mount assembly of claim 5, wherein:

said portion of said plunger comprises a plunger element of said plunger;

said plunger further comprises a plunger cartridge and a biasing element disposed within said plunger cartridge;

said plunger element is supported at least partially within said plunger cartridge such that said biasing element biases said plunger into engagement with said at least a portion of said engagement feature.

7. The mount assembly of claim 1, wherein:

said engagement member comprises an engagement plate including a projection extending outwardly from said engagement plate; and said projection of said engagement plate is configured to engage said at least a portion of said engagement feature of said mounting plate.

8. The mount assembly of claim 7, wherein:

said engagement plate defines an inner face facing towards said outer side of said mounting plate and an opposed outer face; and said projection extends outwardly from said inner face of said engagement plate such that at least a portion of said projection is received within said at least a portion of said engagement feature.

9. The mount assembly of claim 7, wherein said inner face of said engagement plate is positioned directly adjacent to said outer side of said mounting plate.

10. An adjustable mount assembly for mounting covering rods relative to adjacent architectural structures, the mount assembly comprising:

a rod mount including a mounting plate having an inner side and an outer side opposite said inner side, said rod mount further comprising a rod cradle extending outwardly from said outer side of said mounting plate, said rod mount being rotatable about a mount axis to adjust a circumferential position of said rod cradle, said rod cradle defining a rod channel configured to receive an end of a covering rod, said rod channel having an open end along an open side of said rod cradle, with the open end of said rod channel extending from said mounting plate along said mount axis to a distal end of said rod cradle spaced apart from said mounting plate; and an engagement plate supported relative to said rod mount such that said engagement plate is positioned adjacent to said outer side of said mounting plate, said engagement plate including a projection extending outwardly therefrom;

wherein said projection of engagement plate is configured to engage at least a portion of said rod mount relative to said outer side of said mounting plate.

11. The mount assembly of claim 10, wherein:

said mounting plate defines an engagement feature that is recessed relative to said outer side of said mounting plate; and said projection is configured to engage at least a portion of said engagement feature.

12. The mount assembly of claim 11, wherein:

said engagement feature is one of a plurality of engagement features spaced apart circumferentially from one another along said outer side of said mounting plate; and said projection is configured to separately engage each of said plurality of engagement features as said rod mount is rotated relative to said engagement plate about the mount axis.

13. The mount assembly of claim 12, wherein:

the circumferential position of said rod cradle is adjustable to a plurality of pre-defined circumferential positions; and said plurality of engagement features are spaced apart circumferentially from one another relative to said outer side of said mounting plate such that said rod cradle is disposed at one of said plurality of pre-defined circumferential positions when said projection engages a respective one of said plurality of engagement features.

14. The mount assembly of claim 13, wherein:

said plurality of engagement features comprises a plurality of detent features; and as said rod mount is rotated relative to said engagement plate about the mount axis, said projection is configured to separately engage each of said plurality of detent features.

15. The mount assembly of claim 10, wherein:

said engagement plate defines an inner face facing towards said outer side of said mounting plate and an opposed outer face; and said projection extends outwardly from said inner face of said engagement plate such that at least a portion of said projection engages said at least a portion of said rod mount.

16. The mount assembly of claim 15, wherein said inner face of said engagement plate is positioned directly adjacent to said outer side of said mounting plate.

17. An adjustable mount assembly for mounting covering rods relative to adjacent architectural structures, the mount assembly comprising:

a rod mount including a mounting plate having an inner side and an outer side opposite said inner side, said rod mount further comprising a rod cradle extending outwardly from said inner side of said mounting plate, said rod mount being rotatable about a mount axis to adjust a circumferential position of said rod cradle, said rod cradle defining a rod channel configured to receive an end of a covering rod, said rod channel having an open end along a side of said rod cradle, with the open end of said rod channel extending from said mounting plate along said mount axis to a distal end of said rod cradle spaced apart from said mounting plate; and a plunger supported relative to said rod mount such that said plunger is positioned adjacent to said outer side of said mounting plate;

wherein a portion of said plunger is biased into engagement with said rod mount such that said portion of said plunger engages at least a portion of said rod mount as said rod mount is rotated relative to said plunger about the mount axis.

18. The mount assembly of claim 17, wherein:
said portion of said plunger comprises a plunger element of said plunger;
said plunger further comprises a plunger cartridge and a biasing element disposed within said plunger cartridge; and
said plunger element is supported at least partially within said plunger cartridge such that said biasing element biases said plunger into engagement with said at least a portion of said rod mount.

19. The mount assembly of claim 17, wherein:
said mounting plate defines an engagement feature that is recessed relative to said outer side of said mounting plate; and
said portion of said plunger is configured to engage at least a portion of said engagement feature.

20. The mount assembly of claim 19, wherein:
said engagement feature is one of a plurality of engagement features spaced apart circumferentially from one another relative to said outer side of said mounting plate; and
said portion of said plunger is configured to separately engage each of said plurality of engagement features as said rod mount is rotated relative to said engagement plate about the mount axis.

\* \* \* \* \*